United States Patent
Colonna

(10) Patent No.: US 11,594,972 B2
(45) Date of Patent: Feb. 28, 2023

(54) RESONANT POWER CONVERTER

(71) Applicant: 3D PLUS, Buc (FR)

(72) Inventor: Cédric Colonna, Bagneux (FR)

(73) Assignee: 3D PLUS, Buc (FR)

( * ) Notice: Subject to any disclaimer, the term of this patent is extended or adjusted under 35 U.S.C. 154(b) by 0 days.

(21) Appl. No.: 17/342,487

(22) Filed: Jun. 8, 2021

(65) Prior Publication Data

US 2021/0391801 A1 Dec. 16, 2021

(30) Foreign Application Priority Data

Jun. 15, 2020 (FR) ........................................ 2006217

(51) Int. Cl.
*H02M 3/335* (2006.01)
*H02M 1/00* (2006.01)
*H02M 3/337* (2006.01)

(52) U.S. Cl.
CPC ..... *H02M 3/33571* (2021.05); *H02M 1/0058* (2021.05); *H02M 3/337* (2013.01)

(58) Field of Classification Search
CPC .... H02M 3/01; H02M 3/335; H02M 3/33507; H02M 3/33538; H02M 3/33569; H02M 3/33571; H02M 3/33573
USPC .......................................... 363/21.02, 21.03
See application file for complete search history.

(56) References Cited

U.S. PATENT DOCUMENTS

| | | | |
|---|---|---|---|
| 6,246,599 B1 * | 6/2001 | Jang | H02M 3/337 363/17 |
| 6,392,902 B1 | 5/2002 | Jang et al. | |
| 2018/0294732 A1 * | 10/2018 | Ye | H02M 3/01 |

FOREIGN PATENT DOCUMENTS

CN 107 241 020 A 10/2017

OTHER PUBLICATIONS

Choi, "AN-4151 Half-Bridge LLC Resonant Converter Design Using FSFR-Series Fairchild Power Switch (FPS™)", Fairchild, pp. 1-18, 2014.

* cited by examiner

*Primary Examiner* — Gary L Laxton
(74) *Attorney, Agent, or Firm* — BakerHostetler

(57) ABSTRACT

A power converter having a parallel resonant circuit, includes an inverter, a resonant circuit, a transformer comprising a primary circuit and a secondary circuit, control means for the inverter, the inverter being connected to the resonant circuit, which is intended to be connected to an output load via the transformer, the power converter wherein the inverter comprises a first half-bridge and a second half-bridge in parallel with the first half-bridge, a first inductor between the first half-bridge and the resonant circuit, a second inductor between the second half-bridge and the resonant circuit, and in that the first and second inductors have the same inductance and are coupled in the opposite direction to one another.

6 Claims, 5 Drawing Sheets

RESONANT POWER CONVERTER

CROSS-REFERENCE TO RELATED APPLICATIONS

This application claims priority to foreign French patent application No. FR 2006217, filed on Jun. 15, 2020, the disclosure of which is incorporated by reference in its entirety.

FIELD OF THE INVENTION

The field of the invention is that of resonant power converters. The conversion of DC voltage is used in numerous technological fields ranging from the need to convert the supply voltage for devices, such as the conversion of the voltage delivered by a portable computer battery to a processor, to applications moving in much more critical environments such as that of the space industry. The invention is useful in particular in the field of the space industry but can be employed in other fields that require flexibility in the loads to be supplied with power or in the input voltage, in particular the automotive field.

BACKGROUND

Generally, the function of the output of a power converter is to provide the target with the voltage and current required for its operation.

Resonant converters are designed for a given range of input voltages and output currents. In a conventional resonant structure, operation is ensured at the resonant frequency or for a frequency that is close. Under these conditions and for a sufficiently high level of selectivity, the current in the structure is in sinusoidal or quasi-sinusoidal form.

The input voltage or the load is often varied by changing the operating frequency of the power supply for a resonant converter. Now, changing the operating frequency affects the ratio between active power and reactive power and does not permit optimization of the output over the whole range of operation of the resonant converters.

Changing the operating frequency of the power supply for a resonant converter also makes it difficult to size the magnetic elements and the filters around the resonant power converter.

Moreover, for very extensive operating ranges, it becomes difficult to ensure efficient operation in all use scenarios.

FIG. 1 shows a structure known from the prior art. Conventionally, a resonant power converter 1 comprises:
  an inverter 10 provided by two switches Qi1 and Qi2,
  a series resonant circuit LC containing an inductor Lr and a capacitor Cr,
  a transformer T1, comprising a primary circuit 2 with a winding containing N1 turns and a secondary rectifier circuit 3 with a winding containing N2 turns, that allows the DC isolation function to be performed,
  and control means 4 for the inverter 10.

The inverter 10 here allows a (DC) input voltage Vin to be chopped and thus a square-wave signal to be generated. If this square-wave signal is at the right frequency, i.e. at the resonant frequency or at a frequency close to the resonant frequency of the Lr, Cr pair, the current can be considered purely sinusoidal for a sufficiently high level of selectivity. The current then flows through the transformer T1 permitting DC isolation and is transmitted to an output load Rout by way of the secondary rectifier circuit 3.

The addition of an inductor Lm in parallel with the transformer T1, as shown in FIG. 1, allows two resonances to be separated. Operating between these two resonances by changing the frequency makes it possible to vary the output load Rout and to adapt to input and output voltage variations.

The greater the difference between these loads, the greater the difference between the required gains, and the greater the need to change the frequency in order to sweep the desired output voltage range Vout. This has four drawbacks. The first drawback lies with the magnetic elements, that is to say with the inductors and the transformer, which are designed for a precise operating frequency and which can bring about losses in the event of operating frequencies that are removed from their operating area.

The second drawback lies with the dynamic range. Sweeping a large frequency range involves reducing the dynamic range of the system.

An increase in reactive power in the cell can bring about an increase in currents (exchange of energy between the converter and the source) and therefore an increase in losses.

Finally, changing the operating frequency can bring about discontinuities in the output current, increasing the value of the current transmitted to the secondary and therefore increasing losses.

SUMMARY OF THE INVENTION

The invention aims to overcome all or some of the problems cited above by proposing an innovative series-parallel resonant power converter structure capable of extending its use to a broader operating range while guaranteeing good performance. The invention thus provides a resonant power converter that is able to operate for all loads and that has a high dynamic range.

To that end, the invention relates to a power converter having a parallel resonant circuit, comprising:
  an inverter,
  a resonant circuit,
  a transformer comprising a primary circuit and a secondary circuit,
  control means for the inverter, the inverter being connected to the resonant circuit, which is intended to be connected to an output load via the transformer, characterized in that the inverter comprises:
  a first half-bridge and a second half-bridge in parallel with the first half-bridge,
  a first inductor between the first half-bridge and the resonant circuit,
  a second inductor between the second half-bridge and the resonant circuit, and in that the first and second inductors have the same inductance and are coupled in the opposite direction to one another.

According to one aspect of the invention, the second half-bridge is in phase opposition with the first half-bridge for operation under low load.

According to one aspect of the invention, a current $I_C$ flowing through the first and second inductors is such that:

$$I_C = \frac{V_{in}}{8 L_C f_{dec}}$$

where Vin is the input voltage at the terminals of the first half-bridge and the second half-bridge, Lc is the inductance of the first and second inductors and fdec is a chopping frequency of the resonant circuit, for operation under low load.

According to one aspect of the invention, the first half-bridge comprises a first switch and a second switch, the second half-bridge comprises a third switch and a fourth switch, the first half-bridge and the second half-bridge being configured to carry a current and generating a voltage, and the control means for the first half-bridge and the second half-bridge are configured to delay the current relative to the voltage, so as to obtain soft switching.

According to one aspect of the invention, a dead time tm defined as the time for discharging the first capacitor having the capacitance C1, second capacitor having the capacitance C2, third capacitor having the capacitance C3, fourth capacitor having the capacitance C4 and for resetting the first switch, second switch, third switch and fourth switch is such that:

$$t_m = 16 L_C C_{OSS} f_{dec}$$

where $C_{OSS}$ is the output capacitance of the first, second, third and fourth switches.

According to one aspect of the invention, the resonant circuit is an LC circuit.

According to one aspect of the invention, the resonant circuit is an LLC circuit.

According to one aspect of the invention, the second half-bridge is in phase with the first half-bridge for operation under full load.

BRIEF DESCRIPTION OF THE DRAWINGS

The invention will be better understood and other advantages will become apparent on reading the detailed description of an embodiment given by way of example, said description being illustrated by the appended drawing, in which.

For the sake of clarity, the same elements will bear the same reference signs in the various figures.

DETAILED DESCRIPTION

In the present description, the term "in parallel" means that elements that do not belong to the same branch are grouped by their end having the same polarity and operate at the same time. The term "in series" means that the elements belong to the same current branch and operate in succession. The term "in antiparallel" means that the elements are oriented parallel to one another but carry a current in the opposite direction.

Figure 1:
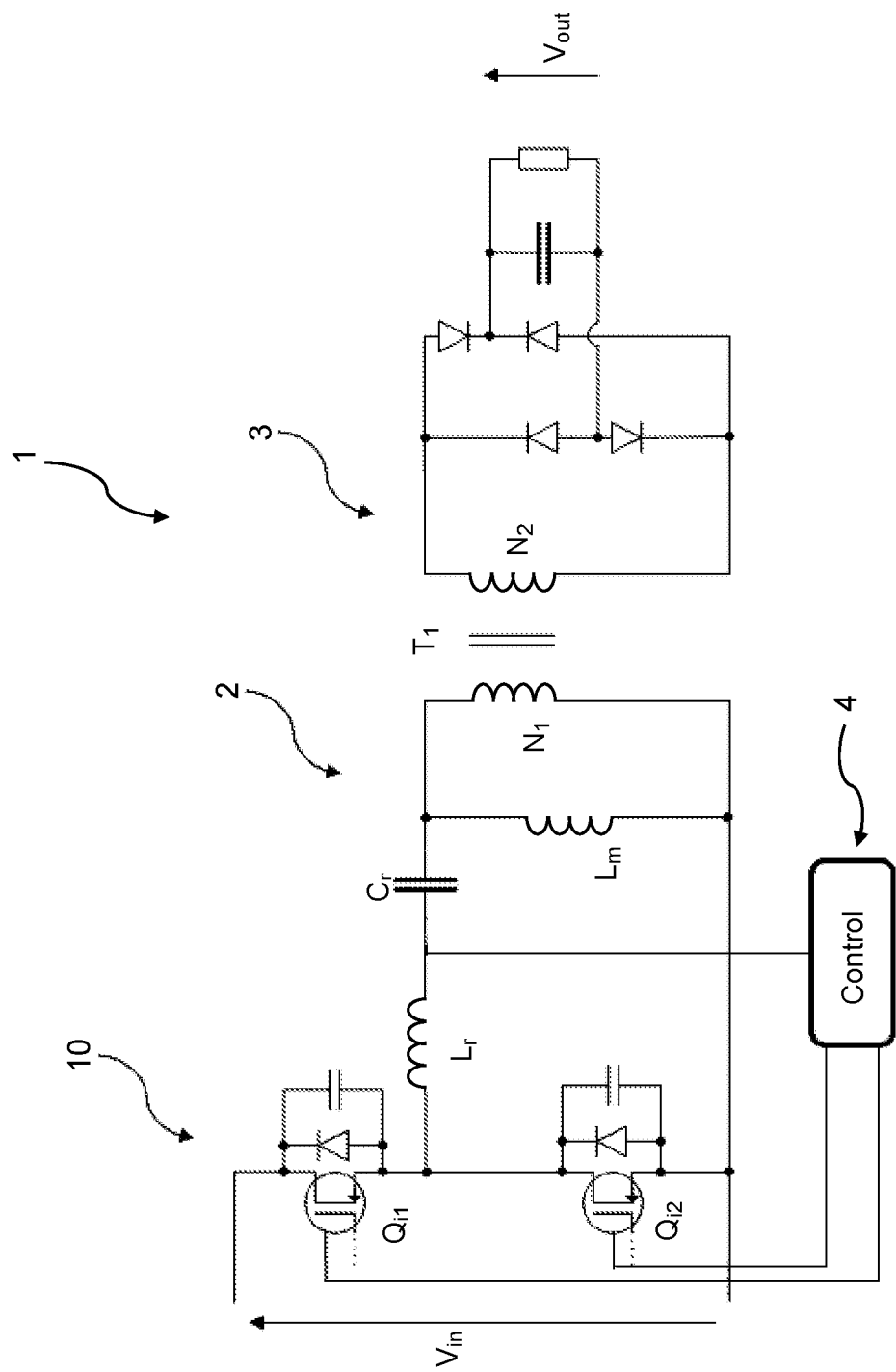
FIG. 1 schematically shows a structure known from the prior art.

FIG. 1, which was presented above, conventionally shows a power converter structure 1 known from the prior art.

Figure 2:
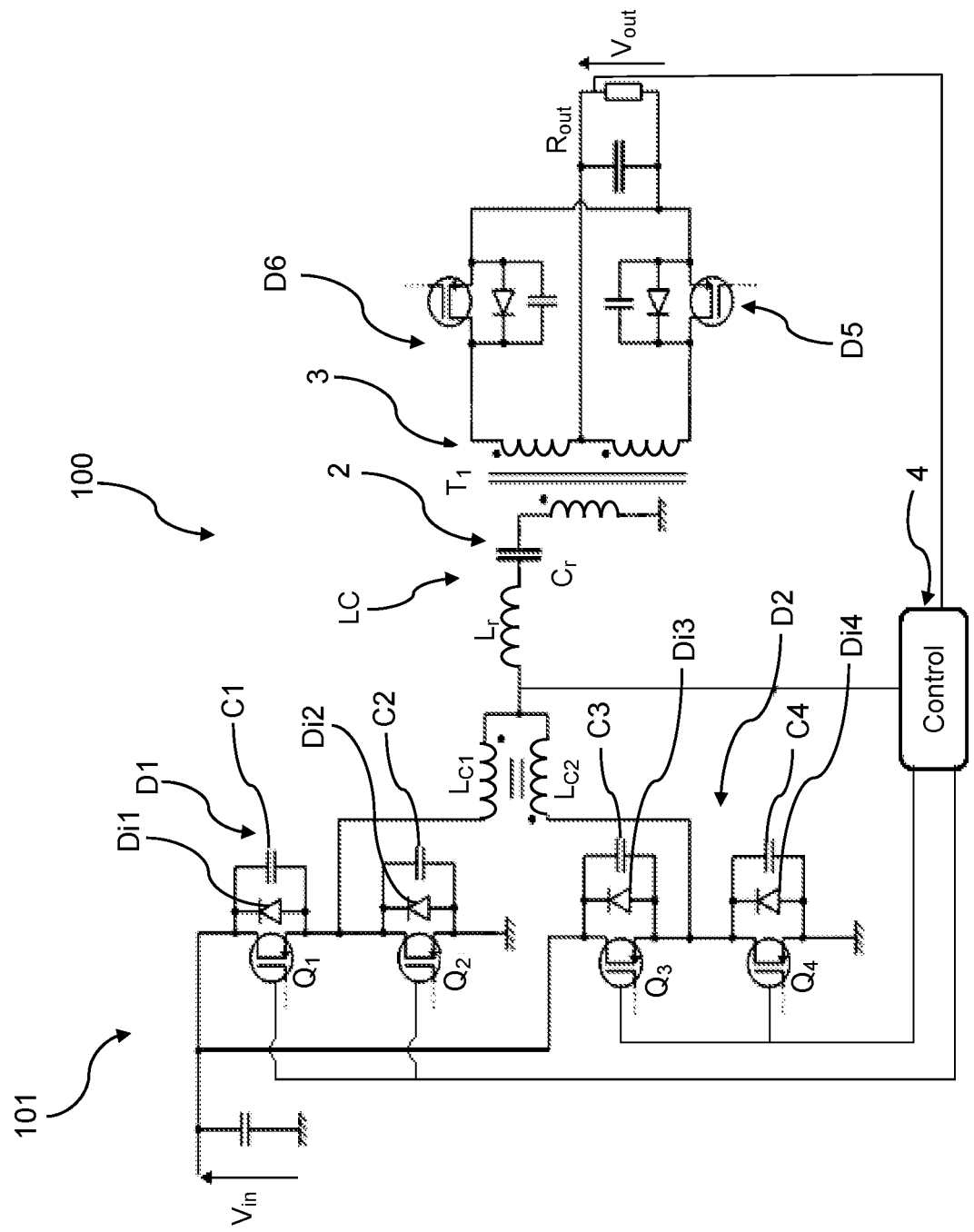
FIG. 2 schematically shows a power converter structure according to the invention.

FIG. 2 schematically shows a structure of a power converter 100 according to the invention. As in the prior art, the power converter 100 comprises:

an inverter 101 that is capable of chopping an input voltage Vin and thus of generating a square-wave signal, a series resonant circuit LC, containing an inductor Lr and a capacitor Cr, that is connected to the inverter 101, a transformer T1, comprising a primary circuit 2 with a winding containing N1 turns and a secondary rectifier circuit 3 with a winding containing N2 and N3 turns, that allows the DC isolation function to be performed, and control means 4 for the inverter 101.

Unlike in the prior art, the inverter 101 is provided by four switches Q1, Q2, Q3 and Q4. The switches Q1 and Q2 form a first half-bridge D1 and the switches Q3 and Q4 form a second half-bridge D2. The first half-bridge D1 is in parallel with the second half-bridge D2. A first inductor Lc1 is positioned in series with the first half-bridge D1 and connects the first half-bridge D1 and the resonant circuit LC. A second inductor Lc2 is positioned in series with the second half-bridge D2 and connects the second half-bridge D2 and the resonant circuit LC. In a non-limiting manner, the switches Q1, Q2, Q3 and Q4 can be transistors, as shown in FIG. 2.

In order to efficiently manage the currents transmitted to the output load Rout, the first inductor Lc1 and the second inductor Lc2 have the same inductance Lc and are coupled in the opposite direction to one another. That is to say that the first inductor Lc1 is in parallel with the second inductor Lc2 and that the second inductor Lc2 carries a current in the opposite direction compared to the current flowing through the first inductor Lc1. It is therefore possible to understand that the first inductor Lc1 and the second inductor Lc2 are realized in the same magnetic circuit, that is to say that the first inductor Lc1 and the second inductor Lc2 carry the same flux produced by the signed sum of the currents that flow through the first inductor Lc1 and the second inductor Lc2.

Thus, during operation under full load, the first half-bridge D1 is in phase with the second half-bridge D2 and the first inductor Lc1 and the second inductor Lc2 are invisible to the power converter structure 100. This is because the currents are opposite in the first inductor Lc1 and the second inductor Lc2, which causes the flux produced in the first inductor Lc1 and the second inductor Lc2 to be zero, and therefore the first inductor Lc1 and the second inductor Lc2 to be invisible to the power converter structure 100.

Conversely, during operation under low load, the first half-bridge D1 and the second half-bridge D2 operate in phase opposition and the currents are opposite and equal. The current provided to the load, which is the sum of the currents, is zero. The opposite currents produce maximum flux in the first inductor Lc1 and the second inductor Lc2 and limit the current flowing between the first half-bridge D1 and the second half-bridge D2. The amplitude of this current is limited by the value of the inductance, which is chosen to ensure soft switching, an effect that is presented below.

The control means 4 take care of management of the two operations cited above and allow intermediate operation between the two types of operation presented. The control means 4 are configured to adjust the phase difference between the first half-bridge D1 and the second half-bridge D2 in order to adjust the output voltage on the basis of the load and the input voltage. The control means 4 can, by way of example, take care of intermediate operation based on a linear management model for the current between the two types of operation. To do this, the control means 4 detect the current at the output of the inverter 101 or the output voltage Vout and control the first half-bridge D1 and the second half-bridge D2 of the inverter 101 on the basis of the detected current.

In this way, the output load Rout of the power converter 100 is no longer managed using variation of the frequency and therefore by removing the operating frequency of the power converter 100 from its resonant frequency, but through variation of the phase shift observed between the currents flowing through the first half-bridge D1 and the second half-bridge D2 of the inverter 101. The power converter 100, as presented, then operates, for all possible cases, at the resonant frequency or close to the resonant frequency, frequencies that ensure efficient operation.

Another drawback of the prior art presented in FIG. 1 is management of losses. This is because when the operating frequency of the power supplies is increased and operation close to the resonant frequency is removed, some of the current that flows in the resonant circuit is not transmitted to the load and creates reactive power. Now, the further removed operation is from the resonant frequency, the more the losses in the switches and especially in the magnetic elements increase.

In contrast to hard switching, when the current or the voltage in the switch is zero or these two components are opposite, the power in the switch is zero. This situation has the advantage of generating only a small amount of loss per switching operation in the switch, owing to the absence of power to dissipate. The energy stored in the stray capacitances of the switches then flows, allowing the latter to turn on without losses, referred to as soft switching. Conversely, when the current and the voltage in a switch are non-zero, a power is dissipated in the switch. This is referred to as hard switching.

When the voltage is zero during a switching operation, those skilled in the art refer to zero-voltage switching (ZVS), and, identically, zero-current switching when the current is zero (ZCS). In general, this effect is called soft switching.

The power converter structure 100, presented in FIG. 2, according to the invention has advantages vis-à-vis soft switching. The reason is that the control means 4 for the inverter 101 are configured to delay the current relative to the voltage, so as to obtain soft switching.

By extension with what has been stated above, thanks to the power converter structure 100 according to the invention, it is possible to operate with soft switching over the whole load range for the power supply. This is an advantage, firstly to limit losses in the switches Q1, Q2, Q3 and Q4, which therefore brings about an improvement in output, and secondly to limit electromagnetic and electrical disturbances caused by the power supply. In this way, the invention allows the size of the filters installed in the power converter 100 to be reduced.

Moreover, each switch Q1, Q2, Q3 and Q4 can have a diode (Di1 for Q1, Di2 for Q2, Di3 for Q3 and Di4 for Q4) in antiparallel with the switch and can have a capacitance (C1 for Q1, C2 for Q2, C3 for Q3 and C4 for Q4), in parallel. These capacitances C1, C2, C3 and C4 can be the stray capacitance of the switch or can be those of a capacitor added as shown in FIG. 2. This allows the power converter 100 to operate with soft switching (ZVS) and even under no load.

What is more, the power converter 100 can be equipped with two transistors D5 and D6, in parallel with the secondary rectifier circuit 3, between the secondary rectifier circuit 3 and the output load Rout.

Figure 3:
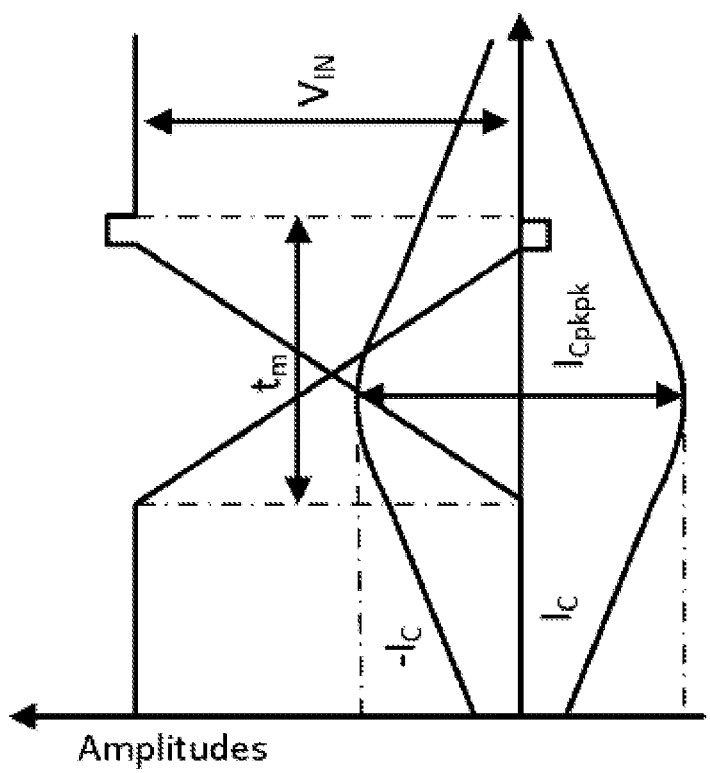
FIG. 3 schematically shows the inverter of the power converter structure according to the invention.
Figure 3:
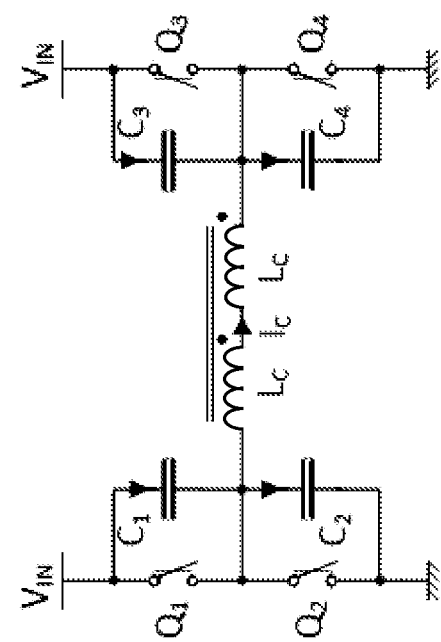

FIG. 3 presents other advantages of the power converter structure 100. FIG. 3 schematically shows the inverter 101 of the structure of the power converter 100 according to the invention in the event of operation under no load, where the currents are opposite in the first inductor Lc1 and the second inductor Lc2. More precisely, FIG. 3 presents the first half-bridge D1, made up of the switches Q1 and Q2 connected in series with the first inductor Lc1, in parallel with the second half-bridge D2, made up of the switches Q3 and Q4 connected in series with the second inductor Lc2.

In this way, a current $I_C$ can be measured, between the first inductor Lc1 and the second inductor Lc2. The current $I_C$ is directly linked to the value of the first inductor Lc1, to the value of the second inductor Lc2 and to the input voltage Vin by way of the following equation:

$$Ic = \frac{V_{in}}{8L_C f_{dec}}$$

where $L_C$ is the value of the first inductor Lc1 and of the second inductor Lc2, Vin is the value of the input voltage, and $f_{dec}$ is the frequency of use of the power converter 100 or chopping frequency.

This formula is valid for operation under no load, when the currents are in phase opposition in the first and second inductors Lc1, Lc2 coupled as illustrated by FIG. 3.

What is more, as the current $I_C$ is dependent on the value of the first inductor Lc1 and the value of the second inductor Lc2, it can be in a current range $I_{Cpkpk}$. The current range $I_{Cpkpk}$ extends around the normalized value of the current $I_C$ on the basis of the operation of the power converter 100.

Another advantage of the structure of the power converter 100 according to the invention is the management of a dead time tm, which is the time required for implementing soft switching. More precisely, the dead time tm is defined as the minimum time allowing the capacitances C1, C2, C3 and C4 to be discharged and the switches Q1, Q2, Q3 and Q4 to be reset. The reason is that the power converter 100 according to the invention allows the dead time tm to be made independent of the input voltage Vin, which simplifies control of the switches Q1, Q2, Q3 and Q4. Thus, the dead time tm can be defined for all operations on the basis of the output capacitances $C_{OSS}$ of the switches Q1, Q2, Q3 and Q4 as:

$$t_m = 16 L_C C_{OSS} f_{dec}$$

The dead time can be interpreted as the maximum time that can be fixed by reason of operation under low load or under no load. It is possible to reduce it for operation under heavy load.

Figure 4:
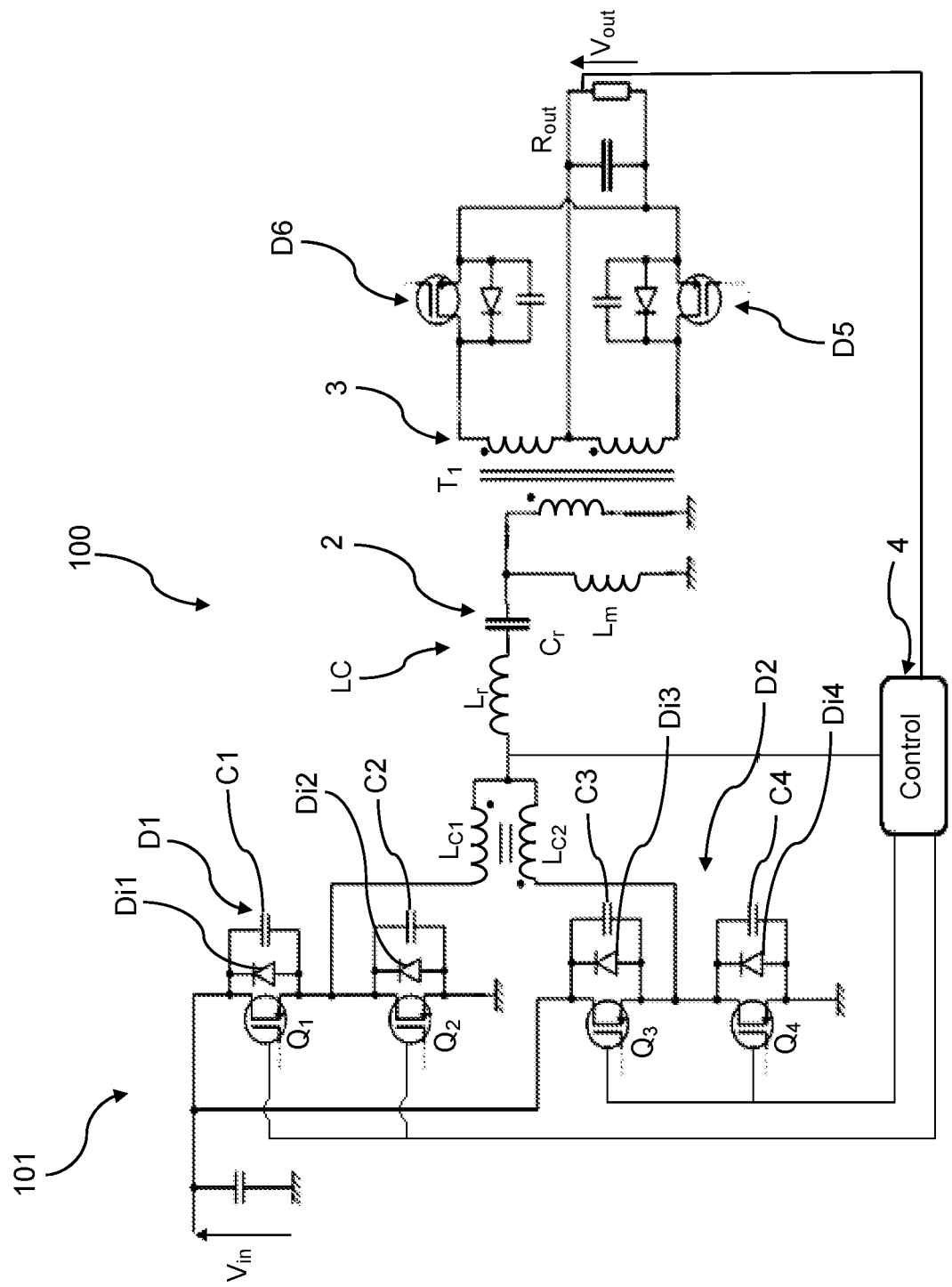
FIG. 4 schematically shows one variant of the power converter structure.

FIG. 4 schematically shows a variant of the power converter structure 100. As presented in FIG. 2, the power converter 100 comprises:

an inverter 101, provided by the four switches Q1, Q2, Q3 and Q4, the switches Q1 and Q2 forming the first half-bridge D1 and the switches Q3 and Q4 forming the second half-bridge D2, that is capable of chopping an input voltage Vin and thus of generating a square-wave signal, a series resonant circuit that is connected to the inverter 101, a transformer T1, comprising a primary circuit 2 with a winding containing N1 turns and a secondary rectifier circuit 3 with a winding containing N2 and N3 turns, that allows the DC isolation function to be performed, and control means 4 for the inverter 101.

This variant of the structure of the power converter 100 adds an inductor Lm in parallel with the transformer T1, which allows two resonances to be separated. The use of the inductor Lm in parallel with the transformer T1 allows the magnetic inductance generated in the transformer T1 to be reduced. The series resonant circuit then becomes an LLC circuit having two inductors Lr and Lm and a capacitor Cr.

The first and second coupled inductors Lc1, Lc2 allow the current exchanged between the first half-bridge D1 and the second half-bridge D2 to be limited when they are in phase opposition and allow the currents to be added without affecting the power converter when they are in phase.

Advantageously, the power supply operates close to the resonant frequency.

Figure 5:
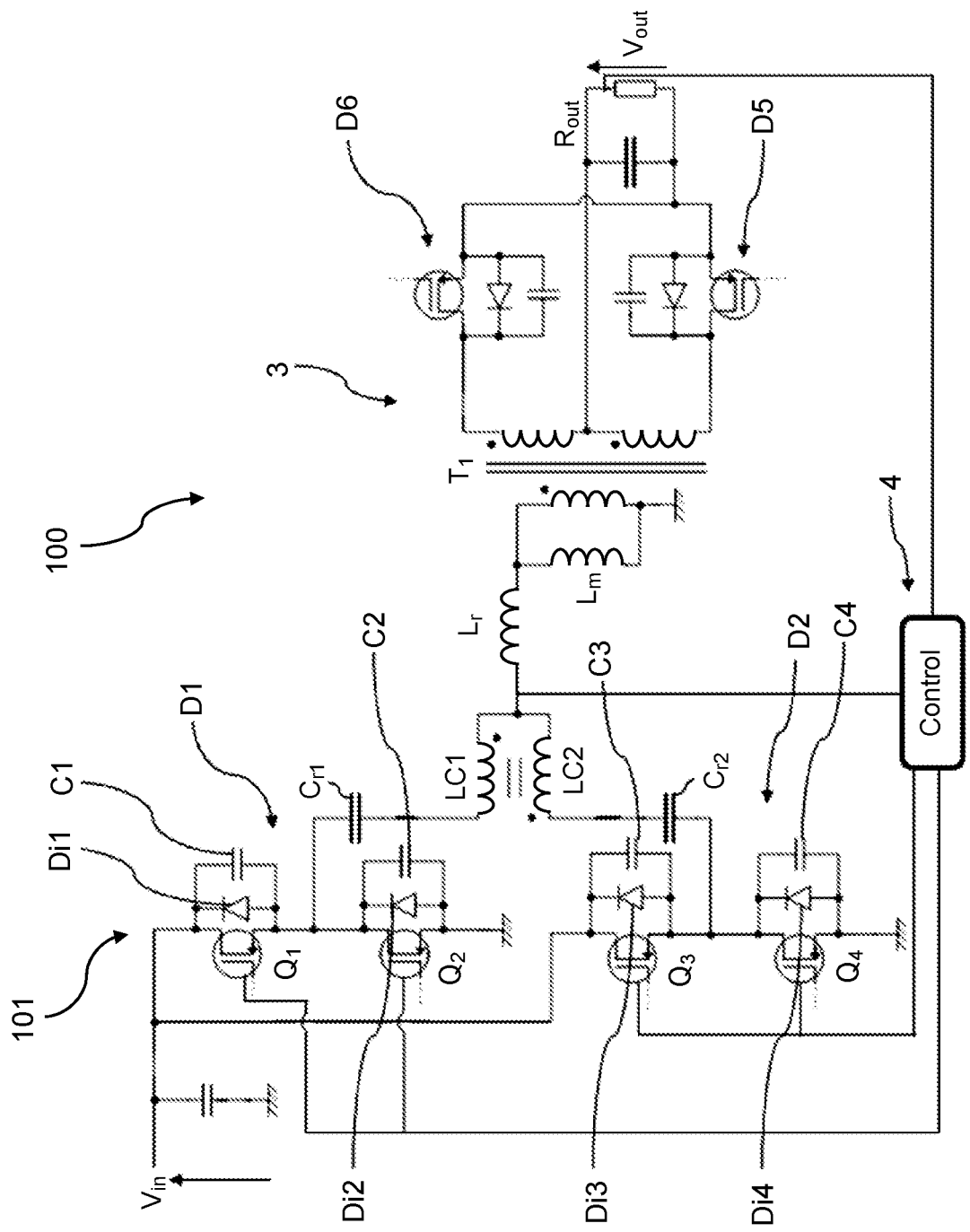
FIG. 5 schematically shows another variant of the power converter structure.

The capacitor Cr of the series resonant circuit can be divided into a first secondary capacitance Cr1 and a second secondary capacitance Cr2, as shown in FIG. 5, each being worth half the initial capacitance of the capacitor Cr. The first secondary capacitance Cr1 is placed between the first half-bridge D1 and the first inductor Lc1 and, in the same way, the second secondary capacitance Cr2 is placed between the second half-bridge D2 and the second inductor Lc2. This configuration makes the system insensitive to asymmetries on the control.

The invention claimed is:

1. A power converter having a parallel resonant circuit, comprising:
   an inverter,
   a resonant circuit (LC),
   a transformer (T1) comprising a primary circuit and a secondary circuit,
   control means for the inverter, the inverter being connected to the resonant circuit (LC), which is intended to be connected to an output load (Rout) via the transformer (T1),
   wherein the power converter comprises an inductor (Lm) in parallel with the transformer (T1) and in that the inverter comprises:
   a first half-bridge (D1) and a second half-bridge (D2) in parallel with the first half-bridge (D1),
   a first inductor (Lc1) between the first half-bridge (D1) and the resonant circuit (LC), a second inductor (Lc2) between the second half-bridge (D2) and the resonant circuit (LC), and in that the first and second inductors (Lc1, Lc2) have the same inductance and are coupled in the opposite direction to one another, wherein the second half-bridge (D2) is in phase opposition with the first half-bridge (D1) for operation under low load and wherein a current lc flowing through the first and second inductors (Lc1, Lc2) is such that:

$$lc = \frac{V_{in}}{8L_C f_{dec}}$$

where Vin is the input voltage at the terminals of the first half-bridge (D1) and the second half-bridge (D2), Lc is the inductance of the first and second inductors (Lc1, Lc2) and fdec is a chopping frequency of the resonant circuit (LC), for operation under low load.

2. The power converter according to claim 1, wherein the first half-bridge (D1) comprises a first switch (Q1) and a second switch (Q2), the second half-bridge (D2) comprises a third switch (Q3) and a fourth switch (Q4), the first half-bridge (D1) and the second half-bridge (D2) being configured to carry a current and generating a voltage, and the control means for the first half-bridge (D1) and the second half-bridge (D2) are configured to delay the current relative to the voltage, so as to obtain soft switching (ZVS).

3. The power converter according to claim 2, wherein the first switch (Q1) comprises a first capacitor having the capacitance C1, the second switch (Q2) comprises a second capacitor having the capacitance C2, the third switch (Q3) comprises a third capacitor having the capacitance C3, the fourth switch (Q4) comprises a fourth capacitor having the capacitance C4, and wherein a dead time tm defined as the time for discharging the first capacitor having the capacitance C1, second capacitor having the capacitance C2, third capacitor having the capacitance C3, fourth capacitor having the capacitance C4 and for resetting the first switch (Q1), second switch (Q2), third switch (Q3) and fourth switch (Q4) is such that:

$$t_m = 16 L_c C_{oss} f_{dec}$$

where $C_{oss}$ is the output capacitance of the first, second, third and fourth switches (Q1, Q2, Q3, Q4).

4. The power converter according to claim 3, wherein the resonant circuit is an LC circuit.

5. The power converter according to claim 3, wherein the resonant circuit is an LLC circuit.

6. The power converter according to claim 1, wherein the second half-bridge (D2) is in phase with the first half-bridge (D1) for operation under full load.

* * * * *